(12) United States Patent
Zhang

(10) Patent No.: US 10,928,331 B2
(45) Date of Patent: Feb. 23, 2021

(54) DISPLAY DEFECT DETECTION METHOD, APPARATUS, AND DEVICE FOR DISPLAY SCREEN

(71) Applicant: Huawei Technologies Co., Ltd., Shenzhen (CN)

(72) Inventor: Huiqiang Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 295 days.

(21) Appl. No.: 15/962,189

(22) Filed: Apr. 25, 2018

(65) Prior Publication Data

US 2018/0246044 A1   Aug. 30, 2018

Related U.S. Application Data

(63) Continuation of application No. PCT/CN2016/102570, filed on Oct. 19, 2016.

(30) Foreign Application Priority Data

Oct. 26, 2015   (CN) .......................... 201510701054.5

(51) Int. Cl.
*G01N 21/95* (2006.01)
*G01N 21/88* (2006.01)
(Continued)

(52) U.S. Cl.
CPC ............ *G01N 21/95* (2013.01); *G01N 21/88* (2013.01); *G02F 1/1309* (2013.01); *G06T 7/001* (2013.01);
(Continued)

(58) Field of Classification Search
CPC ................... G01N 21/95; G01N 21/88; G01N 2021/9513; G02F 1/1309; G02F 2203/69;
(Continued)

(56) References Cited

U.S. PATENT DOCUMENTS

| 5,790,247 A | * | 8/1998 | Henley | ................ | G01N 21/958 356/237.1 |
| 2005/0167620 A1 | * | 8/2005 | Cho | ...................... | G01N 21/95 250/559.45 |

(Continued)

FOREIGN PATENT DOCUMENTS

| CN | 1648645 A | 8/2005 |
| CN | 103218961 A | 7/2013 |

(Continued)

OTHER PUBLICATIONS

Jing Xie et al.,"Infrared thermal images detecting surface defect of steel specimen based on morphological algorithm," vol. 36 No. 3, Journal of China University of Petroleum (Jun. 2012).

(Continued)

*Primary Examiner* — Amandeep Saini
(74) *Attorney, Agent, or Firm* — Leydig, Voit & Mayer, Ltd.

(57) ABSTRACT

The present invention discloses a display defect detection method, apparatus, and device for a display screen. The method includes: identifying a suspected defective pixel from a first image of a front side of a tested display screen, where the first image is shot when the tested display screen is in a solid-color display state; identifying an external smudgy pixel from a second image of the front side of the tested display screen, where the second image is shot when the tested display screen is in a die-out state and the front side is illuminated by a diffuse reflection light source; detecting, for each suspected defective pixel identified from the first image, whether a pixel at a same location in the second image is the external smudgy pixel; and if no, determining the suspected defective pixel as a display defective pixel.

12 Claims, 6 Drawing Sheets

(51) Int. Cl.
 *G02F 1/13* (2006.01)
 *G06T 7/00* (2017.01)
(52) U.S. Cl.
 CPC .... *G06T 7/0008* (2013.01); *G01N 2021/9513* (2013.01); *G02F 2203/69* (2013.01); *G06T 2207/30121* (2013.01)
(58) Field of Classification Search
 CPC ................ G06T 7/0008; G06T 7/001; G06T 2207/30121
 USPC ........................................................ 382/141
 See application file for complete search history.

(56) References Cited

U.S. PATENT DOCUMENTS

| | | | | |
|---|---|---|---|---|
| 2006/0279189 | A1* | 12/2006 | Jeong | H05K 5/02 313/46 |
| 2014/0307944 | A1 | 10/2014 | Chon et al. | |
| 2015/0260908 | A1* | 9/2015 | Kiguchi | G02B 6/0051 349/58 |

FOREIGN PATENT DOCUMENTS

| | | |
|---|---|---|
| CN | 103308279 A | 9/2013 |
| CN | 103940832 A | 7/2014 |
| CN | 104103224 A | 10/2014 |
| CN | 104359917 A | 2/2015 |
| CN | 104412089 A | 3/2015 |
| CN | 105259181 A | 1/2016 |
| JP | 2007285754 A | 11/2007 |
| JP | 2014062771 A | 4/2014 |
| WO | 2014017066 A1 | 1/2014 |

OTHER PUBLICATIONS

Cao, "Research on Flaw Localization Algorithm for Axle Ultrasonic Inspection System," Southwest Jiaotong University (May 2012).

Wang, "The Research of Intelligent Inspection System Based on Strip Surface Quality," Wuhan University of Science and Technology (Apr. 20, 2011).

* cited by examiner

DISPLAY DEFECT DETECTION METHOD, APPARATUS, AND DEVICE FOR DISPLAY SCREEN

CROSS-REFERENCE TO RELATED APPLICATIONS

This application is a continuation of International Application No. PCT/CN2016/102570, filed on Oct. 19, 2016, which claims priority to Chinese Patent Application No. 201510701054.5, filed on Oct. 26, 2015. The disclosures of the aforementioned applications are hereby incorporated by reference in their entireties.

TECHNICAL FIELD

The present invention relates to the field of display technologies, and in particular, to a display defect detection method, apparatus, and device for a display screen.

BACKGROUND

Liquid crystal displays (LCD) are widely applied to various electronic devices and almost become standard configuration of the electronic devices.

In a process of massive LCD production, inevitably, some products with display defects may be produced, for example, a pixel dark dot, a pixel bright dot, or a display defect caused by an impurity mixed in a pixel. Therefore, it is a necessary phase to perform display defect detection on an LCD before an electronic device is delivered from a factory. In a related detection technology, a tested LCD is controlled to be in a lighted-up state, an image of the tested LCD is obtained by shooting a front side of the tested LCD (that is, one side that is of the tested LCD and used to display an image), and then identification and processing are performed on the image, so as to determine whether the tested LCD has a display defect. However, when an external smudge such as dust or a fingerprint is attached on the front side of the tested LCD, erroneous detection may be caused, and an LCD without a display defect is erroneously detected as an LCD that has a display defect. In the prior art, to reduce erroneous detection, a dedicated cleaning phase is added before an image shooting operation, and the tested LCD is wiped by a skilled person or by using a dedicated device to remove a smudge.

However, the foregoing prior art has at least the following problem: Adding a dedicated cleaning phase to reduce an erroneous detection probability undoubtedly decreases a detection speed and affects detection efficiency.

SUMMARY

To resolve a prior-art problem that a detection speed is decreased and detection efficiency is affected when a dedicated cleaning phase is added to reduce an erroneous detection probability, embodiments of the present invention provide a display defect detection method, apparatus, and device for a display screen. The technical solutions are as follows:

According to a first aspect, a display defect detection method for a display screen is provided. The method includes: obtaining a first image of a front side of a tested display screen, where the first image is shot when the tested display screen is in a solid-color display state, and the front side of the tested display screen is a side that is of the tested display screen and that is used to display an image; identifying a suspected defective pixel from the first image, where the suspected defective pixel is a pixel that is in a display area of the tested display screen and whose pixel feature belongs to a first numerical interval, and the first numerical interval is a value range corresponding to a pixel feature of the suspected defective pixel; obtaining a second image of the front side of the tested display screen, where the second image is shot when the tested display screen is in a die-out state and the front side of the tested display screen is illuminated by a diffuse reflection light source; identifying an external smudgy pixel from the second image, where the external smudgy pixel is a pixel that is in the display area of the tested display screen and whose pixel feature belongs to a second numerical interval, and the second numerical interval is a value range corresponding to a pixel feature of the external smudgy pixel; detecting, for each suspected defective pixel identified from the first image, whether a pixel at a same location in the second image is the external smudgy pixel; and determining the suspected defective pixel as a display defective pixel if the same location in the second image is not the external smudgy pixel.

The suspected defective pixel is identified from the first image, and the external smudgy pixel is identified from the second image, so as to determine whether the suspected defective pixel is a display defective pixel according to a location of the suspected defective pixel in the first image and a location of the external smudgy pixel in the second image. Therefore, this resolves a prior-art problem that a detection speed is decreased and detection efficiency is affected when a dedicated cleaning phase is added to reduce an erroneous detection probability; and implements automatic differentiation between an actual display defect and an external smudge, so that erroneous detection caused by a smudge can be avoided, and a detection speed and detection efficiency are also significantly improved compared with those in the prior art.

Based on the technical solution provided in the first aspect, in a possible implementation, the identifying a suspected defective pixel from the first image includes: separately obtaining a pixel feature of each pixel in the display area of the tested display screen in the first image, where the pixel feature includes a luminance value and/or a contrast; detecting whether a first candidate pixel whose pixel feature belongs to the first numerical interval exists in the display area of the tested display screen; if the first candidate pixel whose pixel feature belongs to the first numerical interval exists in the display area of the tested display screen, detecting whether a first candidate pixel block constituted by sequentially arranged first candidate pixels exists and a quantity of pixels in the first candidate pixel block is greater than a first preset threshold; and if the first candidate pixel block exists, identifying each first candidate pixel in the first candidate pixel block as the suspected defective pixel.

In the foregoing manner, a first candidate pixel block that meets the foregoing condition is identified as one suspected defect. Therefore, on the one hand, a tiny display defect that basically imposes no impact on actual use is filtered out; on the other hand, interference from digital noise in the first image to an identification result can be eliminated; furthermore, a subsequent computing processing amount can also be reduced.

Similarly, based on the technical solution provided in the first aspect, in a possible implementation, the identifying an external smudgy pixel from the second image includes: separately obtaining a pixel feature of each pixel in the display area of the tested display screen in the second image, where the pixel feature includes a luminance value and/or a contrast; detecting whether a second candidate pixel whose pixel feature belongs to the second numerical interval exists in the display area of the tested display screen; if the second candidate pixel whose pixel feature belongs to the second numerical interval exists in the display area of the tested display screen, detecting whether a second candidate pixel block constituted by sequentially arranged second candidate pixels exists and a quantity of pixels in the second candidate pixel block is greater than a second preset threshold; and if the second candidate pixel block exists, identifying each second candidate pixel in the second candidate pixel block as the external smudgy pixel.

In the foregoing manner, a second candidate pixel block that meets the foregoing condition is identified as one external smudge, and this can eliminate interference from digital noise in the second image to an identification result.

According to a second aspect, a display defect detection apparatus for a display screen is provided. Function modules included in the apparatus are configured to implement the display defect detection method for a display screen provided in the first aspect.

According to a third aspect, an electronic device is provided. The electronic device includes the display defect detection apparatus for a display screen provided in the second aspect.

According to a fourth aspect, an electronic device is provided. The electronic device includes a processor and a memory. The memory is configured to store one or more instructions. The instructions are executed by the processor; and the instructions are used to implement the display defect detection method for a display screen provided in the first aspect.

According to a fifth aspect, a display defect detection device for a display screen is provided. The device includes a support, and a display-screen fastening component, a diffuse reflection light source component, and an image acquisition component that are separately connected to the support. The display-screen fastening component is configured to fasten a tested display screen; the diffuse reflection light source component is configured to provide a diffuse reflection light source; the image acquisition component is configured to obtain a first image by shooting a front side of the tested display screen when the tested display screen is in a solid-color display state; and the image acquisition component is further configured to obtain a second image by shooting the front side of the tested display screen when the tested display screen is in a die-out state and the front side of the tested display screen is illuminated by the diffuse reflection light source. The front side of the tested display screen is a side that is of the tested display screen and that is used to display an image.

The diffuse reflection light source component is added in the device, and the diffuse reflection light source provided by the diffuse reflection light source component illuminates the tested display screen that is in a die-out state, so as to shoot the second image that records an external smudge. This ensures implementation of automatic differentiation between an actual display defect and an external smudge.

Based on the technical solution provided in the fifth aspect, in a first possible implementation of the fifth aspect, the diffuse reflection light source component includes a housing; a light emitting element disposed inside the housing, where the light emitting element is configured to provide the diffuse reflection light source; a heat dissipation hole disposed on a surface of the housing; and a light shielding cover disposed around an incident ray emitted by the diffuse reflection light source.

A heat dissipation function of the heat dissipation hole avoids an excessively high temperature inside the housing, so as to prevent the light emitting element from being overheated or damaged. Light emitted by the light emitting element is converged by the light shielding cover, and this helps to improve a smudge detection effect.

Based on the technical solution provided in the fifth aspect, in a second possible implementation of the fifth aspect, the device further includes a light source connection component. The light source connection component is configured to connect the diffuse reflection light source component and the support in a movable manner.

The diffuse reflection light source component and the support are connected in a movable manner, so as to adjust a location and/or an angle of the light emitting element to adjust an incident angle of the incident ray emitted by the diffuse reflection light source.

Based on the technical solution provided in the fifth aspect, in a third possible implementation of the fifth aspect, the device further includes a processing component. The processing component includes the display defect detection apparatus for a display screen provided in the second aspect.

In addition, with reference to the technical solution provided in any one of the foregoing aspects, in a possible implementation, an incident angle of an incident ray emitted by the diffuse reflection light source is greater than or equal to 35° and is less than or equal to 550.

The incident angle of the incident ray emitted by the diffuse reflection light source is controlled to be from 35° to 55°, so as to prevent some smudges from being hidden because an image is excessively dark or excessively bright, thereby improving a smudge detection effect. Preferably, the smudge detection effect is optimal when the incident angle of the incident ray emitted by the diffuse reflection light source is equal to 45°.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

Figure 1A:
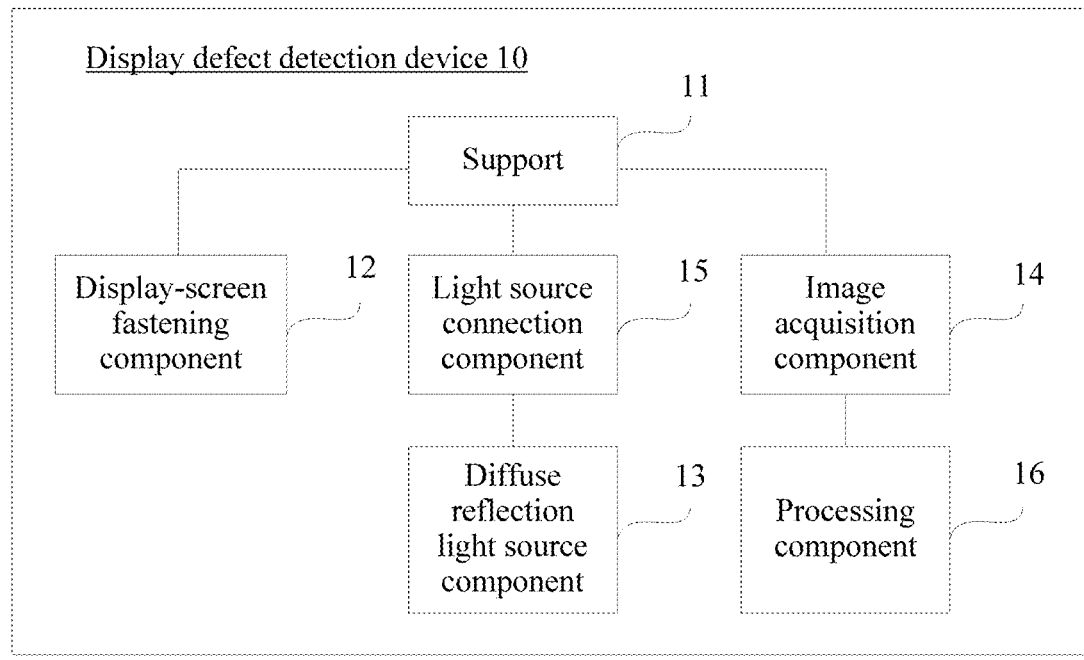
FIG. 1A is a structural block diagram of a display defect detection device for a display screen according to an embodiment of the present invention.

Referring to FIG. 1A, FIG. 1A shows a structural block diagram of a display defect detection device for a display screen according to an embodiment of the present invention. The display defect detection device 10 includes a support 11, and a display-screen fastening component 12, a diffuse reflection light source component 13, and an image acquisition component 14 that are separately connected to the support 11.

The display-screen fastening component 12 is configured to fasten a tested display screen. The diffuse reflection light source component 13 is configured to provide a diffuse reflection light source. The image acquisition component 14 is configured to obtain a first image by shooting a front side of the tested display screen when the tested display screen is in a solid-color display state, where the front side of the tested display screen is a side that is of the tested display screen and that is used to display an image. The solid-color display state may be a state in which a display is lighted up and shows no image. In this case, the tested display screen is in bright white. Alternatively, the solid-color display state may be a state in which a display is lighted up and shows a solid-color image, and the solid-color image may be a pure-white image, a pure-black image, or another solid-color image. The image acquisition component 14 is further configured to obtain a second image by shooting the front side of the tested display screen when the tested display screen is in a die-out state and the front side of the tested display screen is illuminated by the diffuse reflection light source.

The display defect detection device 10 provided in this embodiment may be configured to detect a display defect of an LCD. The display defect includes but is not limited to a pixel dark dot, a pixel bright dot, or a display defect caused by an impurity mixed in a pixel. In addition, the tested display screen may be a display screen mounted on an electronic device or may be a display screen that is not mounted on an electronic device. When a tested LCD is a display screen mounted on the electronic device, the electronic device provides a backlight source and controls the tested LCD to be in a lighted-up state or a die-out state. When a tested LCD is a display screen that is not mounted on the electronic device, the display defect detection device 10 further includes a backlight source component configured to provide a backlight source for the tested display screen, and controls, by using the backlight source component, the tested LCD to be in a lighted-up state or a die-out state. Certainly, in addition to an LCD, the tested display screen may be another type of display screen, for example, an organic light-emitting diode (OLED) display, and this is not limited in this embodiment of the present invention. In addition, a type of the electronic device on which the tested display screen is mounted is not limited in this embodiment of the present invention. For example, the tested display screen may be applied to various electronic devices such as a mobile phone, a tablet computer, an ebook reader, a display, a home appliance device, and a wearable device.

The diffuse reflection light source component 13 is configured to provide a high-uniform diffuse reflection light source. In this embodiment of the present invention, an external smudge on the tested display screen is collected and identified by using a characteristic that when an external smudge is attached on the front side of the tested display screen, a diffuse reflection phenomenon occurs in an incident ray projected at a location of the external smudge. The external smudge includes but is not limited to various types of smudges such as dust, a fingerprint, a water spot, and an oil stain. In an actual application scenario, it is a relatively common phenomenon that dust exists on the tested display screen. In this embodiment of the present invention, the tested display screen is controlled to be in a die-out state, and the diffuse reflection light source provided by the diffuse reflection light source component 13 is used to illuminate the tested display screen, so that an external smudge on the tested display screen appears. In addition, an excessively large incident angle of an incident ray emitted by the diffuse reflection light source makes the second image excessively dark, and an excessively small incident angle thereof makes the second image excessively bright. Some external smudges are hidden when the second image is excessively dark or excessively bright, and this is not conducive to subsequent smudge identification. Therefore, a smudge detection effect is relatively good when the incident angle of the incident ray emitted by the diffuse reflection light source is greater than or equal to 35° and is less than or equal to 55°. Preferably, the incident angle of the incident ray emitted by the diffuse reflection light source is 45°.

Figure 1B:
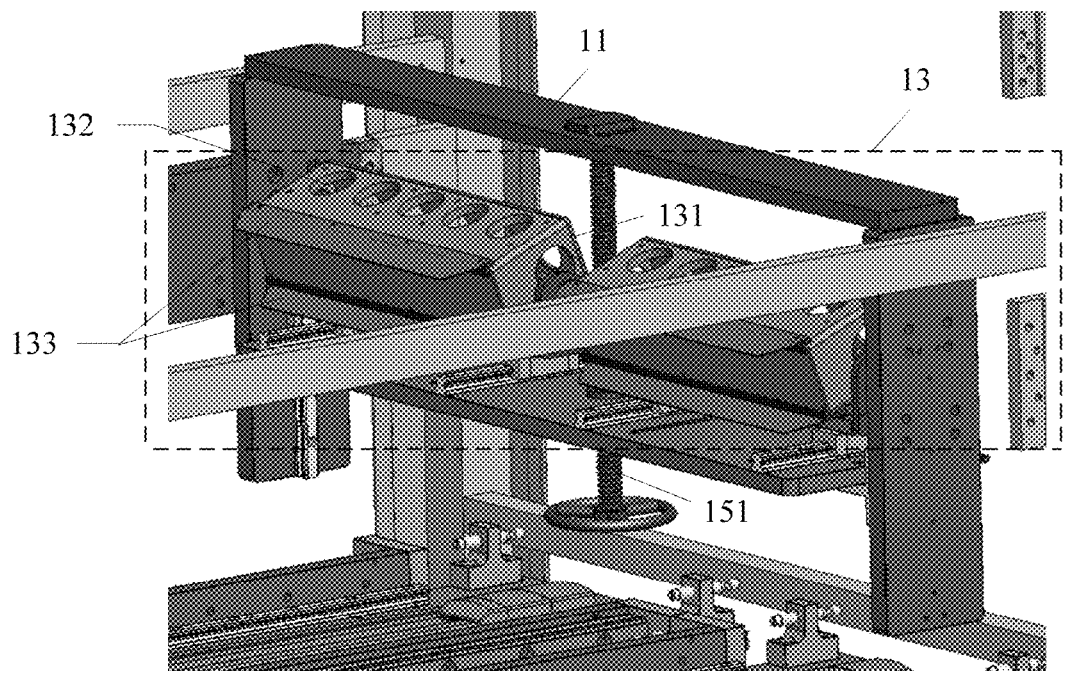
FIG. 1B is a schematic structural diagram of a diffuse reflection light source component according to the embodiment shown in FIG. 1A.

Referring to FIG. 1B, FIG. 1B shows an example of a schematic structural diagram of a diffuse reflection light source component 13. As shown in FIG. 1B, the diffuse reflection light source component 13 includes a housing 131; a light emitting element (not shown in the figure) disposed inside the housing 131, where the light emitting element is configured to provide a diffuse reflection light source; a heat dissipation hole 132 disposed on a surface of the housing 131; and a light shielding cover 133 disposed around an incident ray emitted by the diffuse reflection light source. The heat dissipation hole 132 has a heat dissipation function, and avoids an excessively high temperature inside the housing 131, so that the light emitting element can be prevented from being overheated or even damaged. The light shielding cover 133 is configured to converge light emitted by the diffuse reflection light source, so as to improve a smudge detection effect. Optionally, the light emitting element and the housing 131 are connected in a movable manner, so as to adjust a location and/or an angle of the light emitting element to adjust an incident angle of the incident ray emitted by the diffuse reflection light source.

In addition, the diffuse reflection light source component 13 and the support 11 may be connected in a fastened manner, or may be connected in a movable manner. In a possible implementation, as shown in FIG. 1A, the display defect detection device 10 further includes a light source connection component 15. The light source connection component 15 is configured to connect the diffuse reflection light source component 13 and the support 11 in a movable manner. For example, as shown FIG. 1B, the light source connection component 15 may include a bolt 151. The diffuse reflection light source component 13 is fastened on the support 11 by using the bolt 151, and a location of the diffuse reflection light source component 13 may be adjusted by screwing the bolt 151. The diffuse reflection light source component 13 and the support 11 are connected in a movable manner, so as to conveniently adjust the incident angle of the incident ray emitted by the diffuse reflection light source.

The image acquisition component 14 includes a camera, such as a high-precision camera. The camera is disposed opposite the front side of the tested display screen. In this embodiment of the present invention, the tested display screen is controlled to be in a solid-color display state, and the image acquisition component 14 obtains the first image by shooting the front side of the tested display screen, so as to analyze the first image and identify a suspected defective pixel from the first image. The suspected defective pixel is a pixel that is in a display area of the tested display screen in the first image and whose pixel feature belongs to a first numerical interval, and the first numerical interval is a value range corresponding to a pixel feature of the suspected defective pixel. The first numerical interval may be preset, or may be determined according to a pixel feature of each pixel in the display area of the tested display screen in the first image. A location corresponding to the suspected defective pixel on the tested display screen may be a location of an actual display defect on the tested display screen, or may be a location of an external smudge attached on the front side of the tested display screen. In addition, the tested display screen is further controlled to be in a die-out state and the diffuse reflection light source illuminates the front side of the tested display screen, and the image acquisition component 14 obtains the second image by shooting the front side of the tested display screen, so as to analyze the second image and identify an external smudgy pixel from the second image. The external smudgy pixel is a pixel that is in the display area of the tested display screen in the second image and whose pixel feature belongs to a second numerical interval, and the second numerical interval is a value range corresponding to a pixel feature of the external smudgy pixel. The second numerical interval may be preset, or may be determined according to a pixel feature of each pixel in the display area of the tested display screen in the second image. A location corresponding to the external smudgy pixel on the tested display screen is a location of an external smudge attached on the front side of the tested display screen. In addition, when the first image and the second image are shot, a relative location between the camera and the tested display screen needs to be unchanged, so as to ensure that the shot second image and first image are completely corresponding to each other, thereby ensuring accuracy of subsequent identification and matching.

Optionally, as shown in FIG. 1A, the display defect detection device 10 further includes a processing component 16. The processing component 16 is configured to: obtain the first image and the second image shot by the image acquisition component 14, identify a suspected defective pixel from the first image, and identify an external smudgy pixel from the second image. The processing component 16 is further configured to remove an external smudgy pixel from a suspected defective pixel, and determine a display defective pixel according to a result obtained after the removing. A location corresponding to the display defective pixel on the tested display screen is a location of an actual display defect on the tested display screen. Specifically, the processing component 16 is further configured to: detect, for each suspected defective pixel identified from the first image, whether a pixel at a same location in the second image is the external smudgy pixel, and determine the suspected defective pixel as a display defective pixel if the same location in the second image is not the external smudgy pixel. The processing component 16 has data processing and computing functions. For example, the processing component 16 may be a computer.

Figure 2:
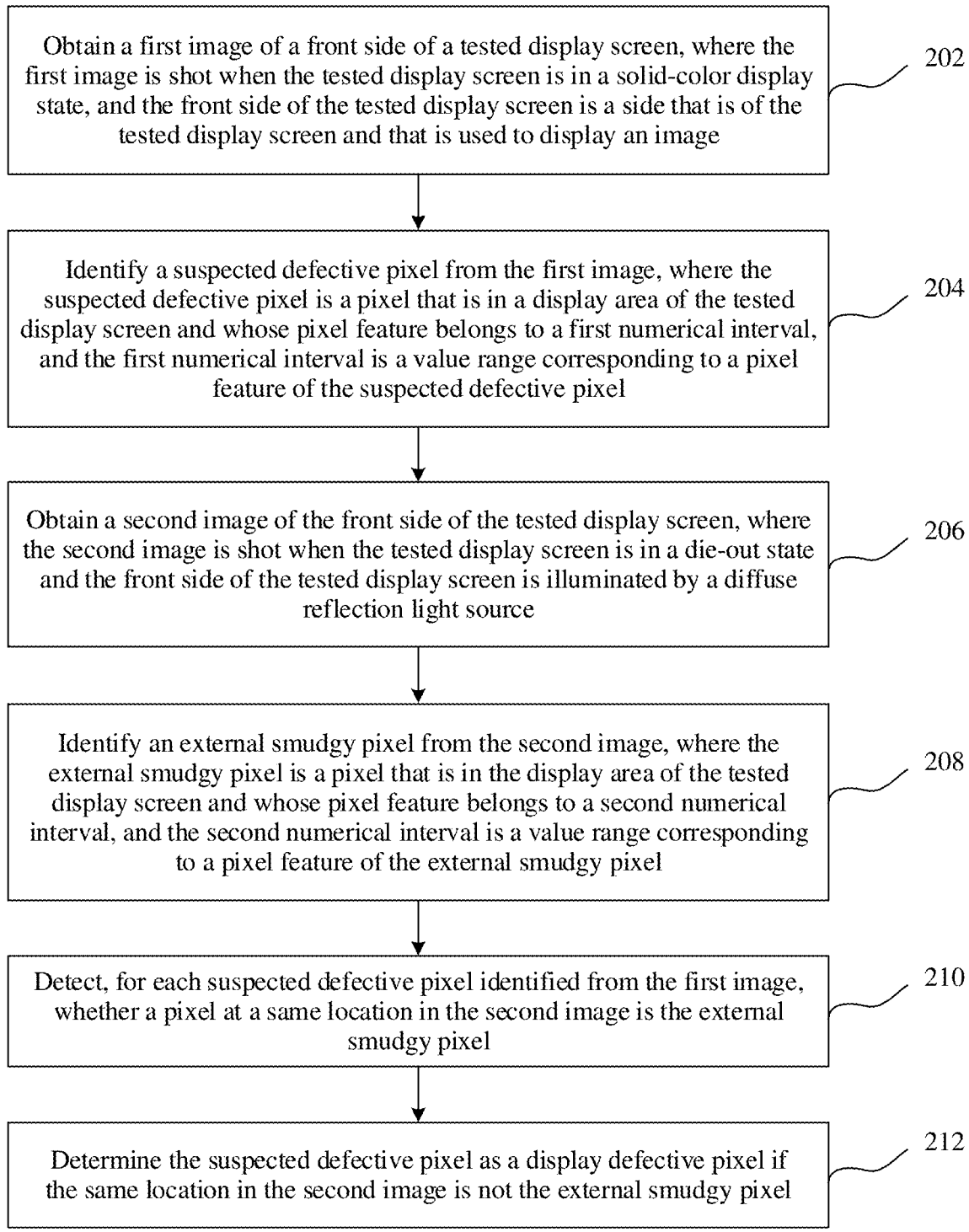
FIG. 2 is a flowchart of a display defect detection method for a display screen according to an embodiment of the present invention.

Referring to FIG. 2, FIG. 2 shows a flowchart of a display defect detection method for a display screen according to an embodiment of the present invention. The method may be applied to the processing component 16 in the display defect detection device 10 shown in FIG. 1A. The method may include the following blocks:

Block 202: Obtain a first image of a front side of a tested display screen, where the first image is shot when the tested display screen is in a solid-color display state, and the front side of the tested display screen is a side that is of the tested display screen and that is used to display an image.

Block 204: Identify a suspected defective pixel from the first image, where the suspected defective pixel is a pixel that is in a display area of the tested display screen and whose pixel feature belongs to a first numerical interval, and the first numerical interval is a value range corresponding to a pixel feature of the suspected defective pixel.

Block 206: Obtain a second image of the front side of the tested display screen, where the second image is shot when the tested display screen is in a die-out state and the front side of the tested display screen is illuminated by a diffuse reflection light source.

Block 208: Identify an external smudgy pixel from the second image, where the external smudgy pixel is a pixel that is in the display area of the tested display screen and whose pixel feature belongs to a second numerical interval, and the second numerical interval is a value range corresponding to a pixel feature of the external smudgy pixel.

Block 210: Detect, for each suspected defective pixel identified from the first image, whether a pixel at a same location in the second image is the external smudgy pixel.

Block 212: Determine the suspected defective pixel as a display defective pixel if the same location in the second image is not the external smudgy pixel.

In conclusion, according to the method provided in this embodiment, the suspected defective pixel is identified from the first image, and the external smudgy pixel is identified from the second image, so as to determine whether the suspected defective pixel is a display defective pixel according to a location of the suspected defective pixel in the first image and a location of the external smudgy pixel in the second image. Therefore, this resolves a prior-art problem that a detection speed is decreased and detection efficiency is affected when a dedicated cleaning phase is added to reduce an erroneous detection probability; and implements automatic differentiation between an actual display defect and an external smudge, so that erroneous detection caused by a smudge can be avoided, and a detection speed and detection efficiency are also significantly improved compared with those in the prior art.

Figure 3A:
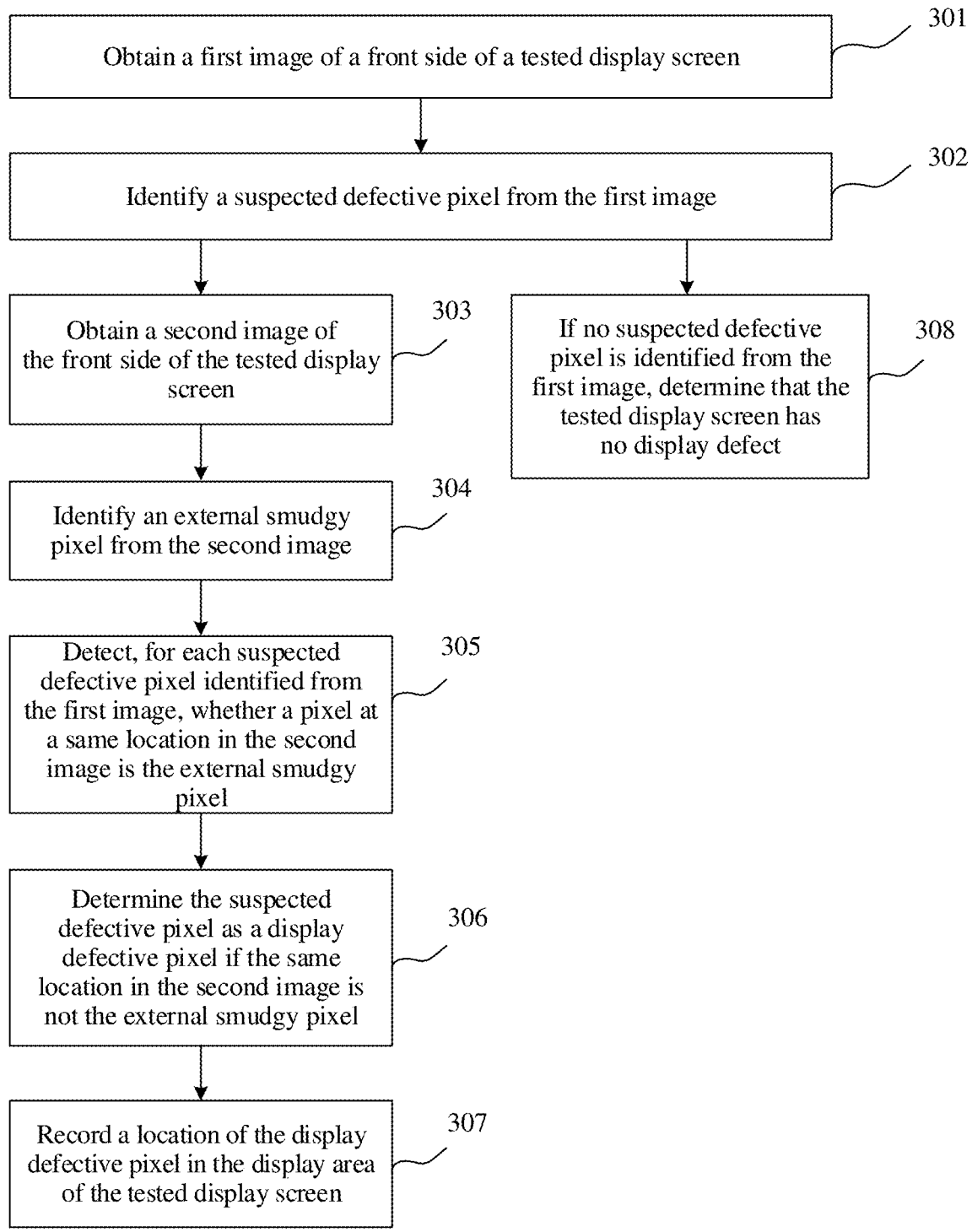
FIG. 3A is a flowchart of a display defect detection method for a display screen according to another embodiment of the present invention.

Referring to FIG. 3A, FIG. 3A shows a flowchart of a display defect detection method for a display screen according to another embodiment of the present invention. In this embodiment, that the method is applied to the processing component 16 of the display defect detection device shown in FIG. 1A is used as an example for description. The method may include the following blocks:

Block 301: Obtain a first image of a front side of a tested display screen.

The processing component obtains the first image of the front side of the tested display screen. The front side of the tested display screen is a side that is of the tested display screen and that is used to display an image. The first image is obtained by shooting the front side of the tested display screen. The first image includes a complete image of the front side of the tested display screen.

The first image is shot when the tested display screen is in a solid-color display state. The solid-color display state may be a state in which a display is lighted up and shows no image. In this case, the tested display screen is in bright white. Alternatively, the solid-color display state may be a state in which a display is lighted up and shows a solid-color image, and the solid-color image may be a pure-white image, a pure-black image, or another solid-color image. When the tested display screen is in the solid-color display state, all display defects of the tested display screen appear. The display defect includes but is not limited to a pixel dark dot, a pixel bright dot, or a display defect caused by an impurity mixed in a pixel. Therefore, when the tested display screen has a display defect, the display defect is recorded in the first image. In addition, when an external smudge is attached on the front side of the tested display screen, all or some of the external smudge may be recorded in the first image. The external smudge includes but is not limited to various types of smudges such as dust, a fingerprint, a water spot, and an oil stain.

Block 302: Identify a suspected defective pixel from the first image.

The processing component identifies the suspected defective pixel from the first image. The suspected defective pixel is a pixel that is in a display area of the tested display screen in the first image and whose pixel feature belongs to a first numerical interval. The first numerical interval is a value range corresponding to a pixel feature of the suspected defective pixel. The first numerical interval may be preset; or the first numerical interval may be determined according to a pixel feature of each pixel in the display area of the tested display screen in the first image. The pixel feature includes a luminance value and/or a contrast. For example, in the display area of the tested display screen in the first image, a pixel with a luminance value less than a first luminance value threshold is identified as a suspected defective pixel. For another example, in the display area of the tested display screen in the first image, a pixel with a contrast greater than a first contrast threshold is identified as a suspected defective pixel. Certainly, in another possible implementation, the two aspects, the luminance value and the contrast, may also be comprehensively considered, so as to identify a suspected defective pixel from the first image.

A location corresponding to the suspected defective pixel on the tested display screen may be a location of an actual display defect on the tested display screen, or may be a location of an external smudge attached on the front side of the tested display screen. A distribution shape of one suspected defect (an actual display defect or external smudge) may be a shape of a dot, a line, a spot, or the like. Therefore, one suspected defect is corresponding to one or more suspected defective pixels.

In a possible implementation, this block includes the following several subblocks:

1. Separately obtain a pixel feature of each pixel in the display area of the tested display screen in the first image.

2. Detect whether a first candidate pixel whose pixel feature belongs to the first numerical interval exists in the display area of the tested display screen.

3. If the first candidate pixel whose pixel feature belongs to the first numerical interval exists in the display area of the tested display screen, detect whether a first candidate pixel block constituted by sequentially arranged first candidate pixels exists and a quantity of pixels in the first candidate pixel block is greater than a first preset threshold.

4. If the first candidate pixel block exists, identify each first candidate pixel in the first candidate pixel block as the suspected defective pixel.

The first preset threshold may be set according to a resolution of a camera in an image acquisition component. For example, the first preset threshold is set to 20. In the foregoing manner, a first candidate pixel block that meets the foregoing condition is identified as one suspected defect. Therefore, on the one hand, a tiny display defect that basically imposes no impact on actual use is filtered out; on the other hand, interference from digital noise in the first image to an identification result can be eliminated; furthermore, a subsequent computing processing amount can also be reduced.

Block 303: Obtain a second image of the front side of the tested display screen.

The processing component obtains the second image of the front side of the tested display screen. The second image is also obtained by shooting the front side of the tested display screen. The second image includes a complete image of the front side of the tested display screen.

The second image is shot when the tested display screen is in a die-out state and the front side of the tested display screen is illuminated by a diffuse reflection light source. When the tested display screen is in the die-out state, none of display defects of the tested display screen is visible. Further, the diffuse reflection light source illuminates the front side of the tested display screen. Therefore, when an external smudge is attached on the front side of the tested display screen, a diffuse reflection phenomenon occurs in an incident ray projected at a location of the external smudge. Correspondingly, the external smudge is recorded in the second image.

In addition, an excessively large incident angle of an incident ray emitted by the diffuse reflection light source makes the second image excessively dark, and an excessively small incident angle thereof makes the second image excessively bright. Some external smudges are hidden when the second image is excessively dark or excessively bright, and this is not conducive to subsequent smudge identification. Therefore, a smudge detection effect is relatively good when the incident angle of the incident ray emitted by the diffuse reflection light source is greater than or equal to 35° and is less than or equal to 55°. Preferably, the incident angle of the incident ray emitted by the diffuse reflection light source is 45°.

Block 304: Identify an external smudgy pixel from the second image.

The processing component identifies the external smudgy pixel from the second image. The external smudgy pixel is a pixel that is in the display area of the tested display screen in the second image and whose pixel feature belongs to a second numerical interval. The second numerical interval is a value range corresponding to a pixel feature of the external smudgy pixel. The second numerical interval may be preset; or the second numerical interval may be determined according to a pixel feature of each pixel in the display area of the tested display screen in the second image. The pixel feature includes a luminance value and/or a contrast. For example, in the display area of the tested display screen in the second image, a pixel with a luminance value greater than a second luminance value threshold is identified as the external smudgy pixel. For another example, in the display area of the tested display screen in the second image, a pixel with a contrast greater than a second contrast threshold is identified as the external smudgy pixel. Certainly, in another possible implementation, the two aspects, the luminance value and the contrast, may also be comprehensively considered, so as to identify an external smudgy pixel from the second image.

A location corresponding to the external smudgy pixel on the tested display screen is a location of an external smudge attached on the front side of the tested display screen. A distribution shape of one external smudge may be a shape of a dot, a line, a spot, or the like. Therefore, one external smudge is corresponding to one or more external smudgy pixels.

Similar to a manner of identifying a suspected defective pixel, in a possible implementation, this block includes the following subblocks:

1. Separately obtain a pixel feature of each pixel in the display area of the tested display screen in the second image.

2. Detect whether a second candidate pixel whose pixel feature belongs to the second numerical interval exists in the display area of the tested display screen.

3. If the second candidate pixel whose pixel feature belongs to the second numerical interval exists in the display area of the tested display screen, detect whether a second candidate pixel block constituted by sequentially arranged second candidate pixels exists and a quantity of pixels in the second candidate pixel block is greater than a second preset threshold.

4. If the second candidate pixel block exists, identify each second candidate pixel in the second candidate pixel block as the external smudgy pixel.

The second preset threshold may be set according to the resolution of the camera in the image acquisition component. For example, the second preset threshold is set to 20. In the foregoing manner, a second candidate pixel block that meets the foregoing condition is identified as one external smudge, and this can eliminate interference from digital noise in the second image to an identification result.

When a suspected defective pixel is identified from the first image, the processing component removes an external smudgy pixel from the suspected defective pixel, and determines a display defective pixel according to a result obtained after the removing. A location corresponding to the display defective pixel on the tested display screen is a location of an actual display defect on the tested display screen. Specifically, the following block 305 and block 306 are included.

Block 305: Detect, for each suspected defective pixel identified from the first image, whether a pixel at a same location in the second image is the external smudgy pixel.

Block 306: Determine the suspected defective pixel as a display defective pixel if the same location in the second image is not the external smudgy pixel.

Figure 3B:
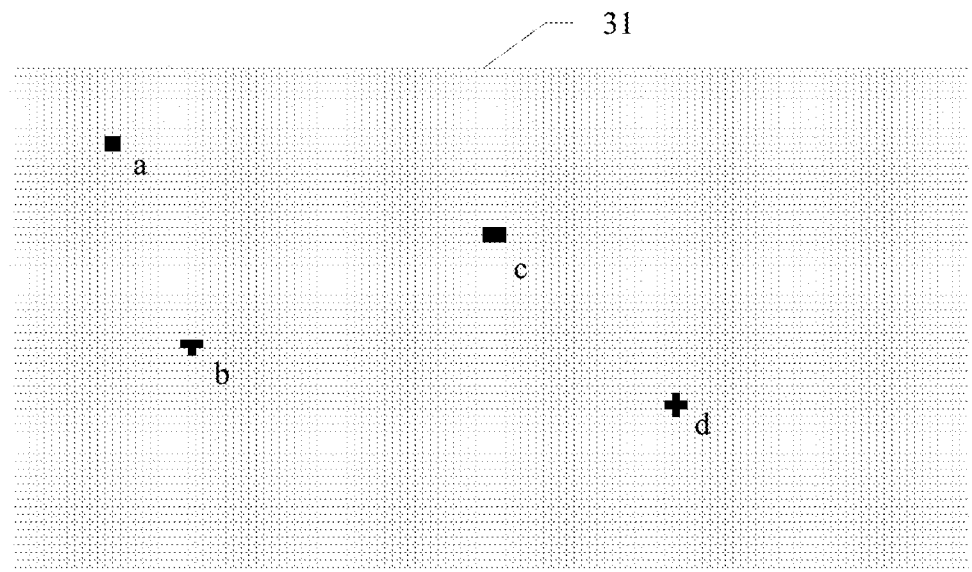
FIG. 3B is a schematic diagram of a first image in the embodiment shown in FIG. 3A.
Figure 3C:
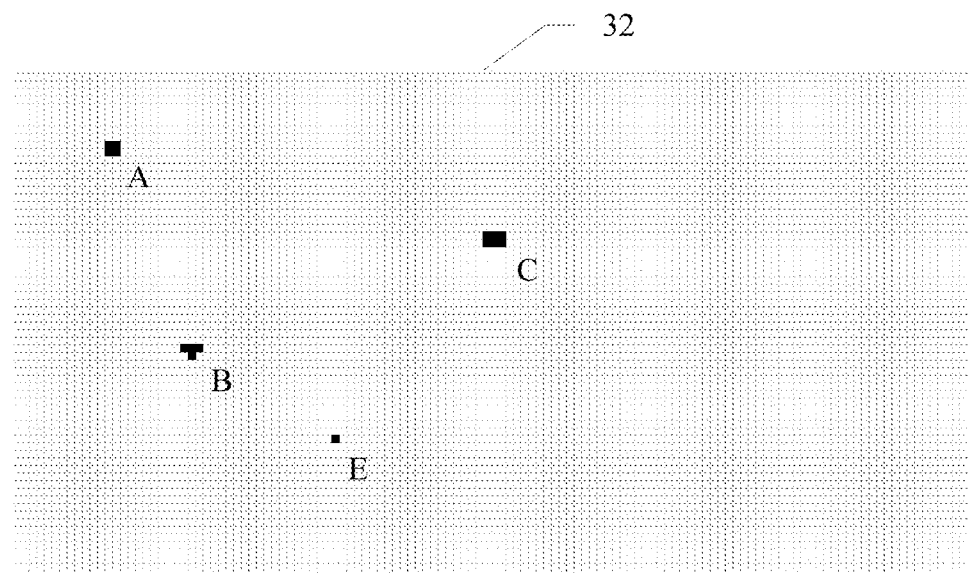
FIG. 3C is a schematic diagram of a second image in the embodiment shown in FIG. 3A.

In an example, referring to FIG. 3B and FIG. 3C, it is assumed that four suspected defects are identified at four locations a, b, c, and d in a first image 31 (shown in FIG. 3B), and four external smudges are identified at four locations A, B, C, and E in a second image 32 (shown in FIG. 3C). After comparison and analysis, it may be determined that suspected defects at three locations a, b, and c are external smudges instead of actual display defects, and a pixel at a same location of the suspected defect at the location d in the second image 32 is not an external smudge, so that the suspected defect at the location d is an actual display defect.

If a pixel at a same location of each suspected defective pixel in the second image is an external smudgy pixel, it is determined that the tested display screen has no display defect.

Optionally, when the display defective pixel exists in the suspected defective pixel, this embodiment further includes the following block 307.

Block 307: Record a location of the display defective pixel in the display area of the tested display screen.

The processing component records the location of the display defective pixel in the display area of the tested display screen, so as to subsequently correctly find a location of a display defect from the tested display screen according to the recorded location, and repair the display defect.

In addition, after the foregoing block 302, the following block 308 is further included.

Block 308: If no suspected defective pixel is identified from the first image, determine that the tested display screen has no display defect.

If no suspected defective pixel is identified from the first image, the processing component determines that the tested display screen has no display defect. In an actual application scenario, a probability of a tested display screen being a good product (that has no display defect) is far greater than a probability of a tested display screen being a defective product (that has a display defect), usually a detection environment is relatively clean and dust-free, and only a small part of tested display screens may have an external smudge attached on a surface thereof. Therefore, to reduce a computing processing amount of the processing component, blocks 301 and 302 are preferably performed, and blocks 303 and 304 are further performed when a suspected defective pixel is identified from the first image. Otherwise, when no suspected defective pixel is identified from the first image, it may be directly determined that the tested display screen is a good product, and blocks 303 and 304 do not need to be performed to process and analyze the second image.

It should be added that because the first image is shot when the tested display screen is in a lighted-up state, some tiny external smudges may be hidden and unable to be recorded in the first image. However, this does not affect detection and identification for a display defect because it is only required to ensure that all actual display defects are included in suspected defects recorded in the first image.

In conclusion, according to the method provided in this embodiment, the suspected defective pixel is identified from the first image, and the external smudgy pixel is identified from the second image, so as to determine whether the suspected defective pixel is a display defective pixel according to a location of the suspected defective pixel in the first image and a location of the external smudgy pixel in the second image. Therefore, this resolves a prior-art problem that a detection speed is decreased and detection efficiency is affected when a dedicated cleaning phase is added to reduce an erroneous detection probability; and implements automatic differentiation between an actual display defect and an external smudge, so that erroneous detection caused by a smudge can be avoided, and a detection speed and detection efficiency are also significantly improved compared with those in the prior art.

In addition, the first candidate pixel block constituted by sequentially arranged first candidate pixels whose quantity is greater than the first preset threshold is further identified as one suspected defect. Therefore, on the one hand, a tiny display defect that basically imposes no impact on actual use is filtered out; on the other hand, interference from digital noise in the first image to an identification result can be eliminated; furthermore, a subsequent computing processing amount can also be reduced. Similarly, the second candidate pixel block constituted by sequentially arranged second candidate pixels whose quantity is greater than the second preset threshold is identified as one external smudge, so as to eliminate interference from digital noise in the second image to an identification result.

In addition, the incident angle of the incident ray emitted by the diffuse reflection light source is further controlled to be from 35° to 55°, so as to prevent some smudges from being hidden because an image is excessively dark or excessively bright, thereby improving a smudge detection effect. Preferably, the smudge detection effect is optimal when the incident angle of the incident ray emitted by the diffuse reflection light source is equal to 45°.

In addition, compared with the prior art, only one diffuse reflection light source component needs to be added in terms of hardware, and the tested display screen does not need to be wiped by a skilled person or by using a dedicated device to remove a smudge. Therefore, device and manpower costs are fully reduced.

In the foregoing method embodiment, that blocks are performed by the processing component is merely used as an example for description. In another possible implementation, the blocks may be performed by an electronic device independent of the foregoing display defect detection device for a display screen, and the electronic device may be an independent computer.

The following is an apparatus embodiment of the present invention, and the apparatus embodiment may be used to execute the method embodiment of the present invention. For details not disclosed in the apparatus embodiment of the present invention, refer to the method embodiment of the present invention.

Figure 4:
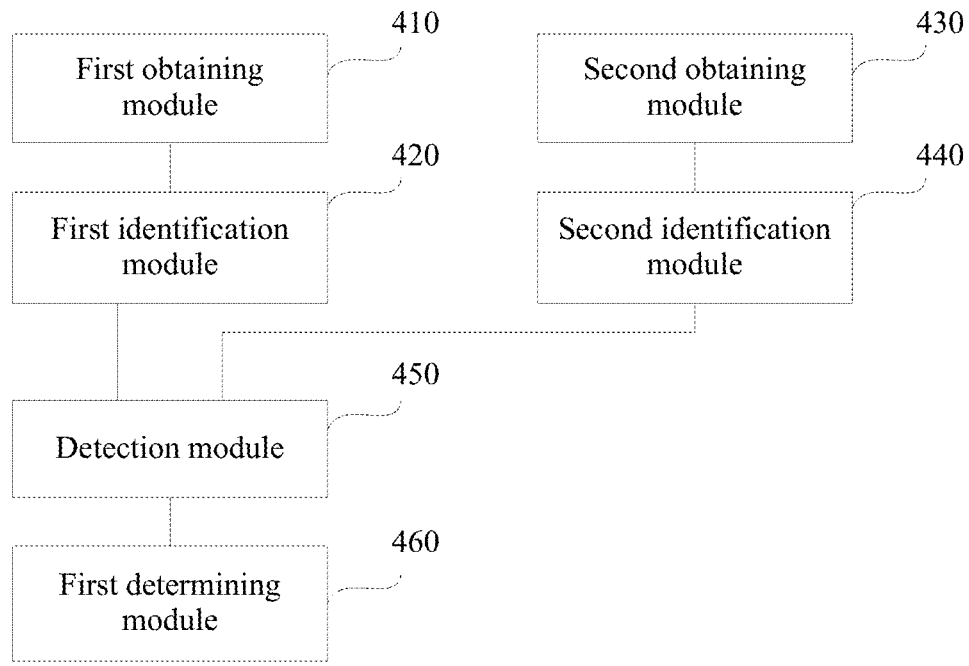
FIG. 4 is a structural block diagram of a display defect detection apparatus for a display screen according to an embodiment of the present invention.

Referring to FIG. 4, FIG. 4 shows a structural block diagram of a display defect detection apparatus for a display screen according to an embodiment of the present invention. Software, hardware, or a combination of the software and the hardware may be used to implement the apparatus as a part or all of an electronic device that has a computing processing capability. The apparatus may include a first obtaining module 410, a first identification module 420, a second obtaining module 430, a second identification module 440, a detection module 450, and a first determining module 460.

The first obtaining module 410 is configured to obtain a first image of a front side of a tested display screen, where the first image is shot when the tested display screen is in a solid-color display state, and the front side of the tested display screen is a side that is of the tested display screen and that is used to display an image.

The first identification module 420 is configured to identify a suspected defective pixel from the first image obtained by the first obtaining module 410, where the suspected defective pixel is a pixel that is in a display area of the tested display screen and whose pixel feature belongs to a first numerical interval, and the first numerical interval is a value range corresponding to a pixel feature of the suspected defective pixel.

The second obtaining module 430 is configured to obtain a second image of the front side of the tested display screen, where the second image is shot when the tested display screen is in a die-out state and the front side of the tested display screen is illuminated by a diffuse reflection light source.

The second identification module 440 is configured to: identify an external smudgy pixel from the second image obtained by the second obtaining module 430, where the external smudgy pixel is a pixel that is in the display area of the tested display screen and whose pixel feature belongs to a second numerical interval, and the second numerical interval is a value range corresponding to a pixel feature of the external smudgy pixel.

The detection module 450 is configured to detect, for each suspected defective pixel identified by the first identification module 420 from the first image, whether a pixel at a same location in the second image is the external smudgy pixel.

The first determining module 460 is configured to determine the suspected defective pixel as a display defective pixel if the detection module 450 detects that the same location in the second image is not the external smudgy pixel.

In conclusion, according to the apparatus provided in this embodiment, the suspected defective pixel is identified from the first image, and the external smudgy pixel is identified from the second image, so as to determine whether the suspected defective pixel is a display defective pixel according to a location of the suspected defective pixel in the first image and a location of the external smudgy pixel in the second image. Therefore, this resolves a prior-art problem that a detection speed is decreased and detection efficiency is affected when a dedicated cleaning phase is added to reduce an erroneous detection probability; and implements automatic differentiation between an actual display defect and an external smudge, so that erroneous detection caused by a smudge can be avoided, and a detection speed and detection efficiency are also significantly improved compared with those in the prior art.

Figure 5:
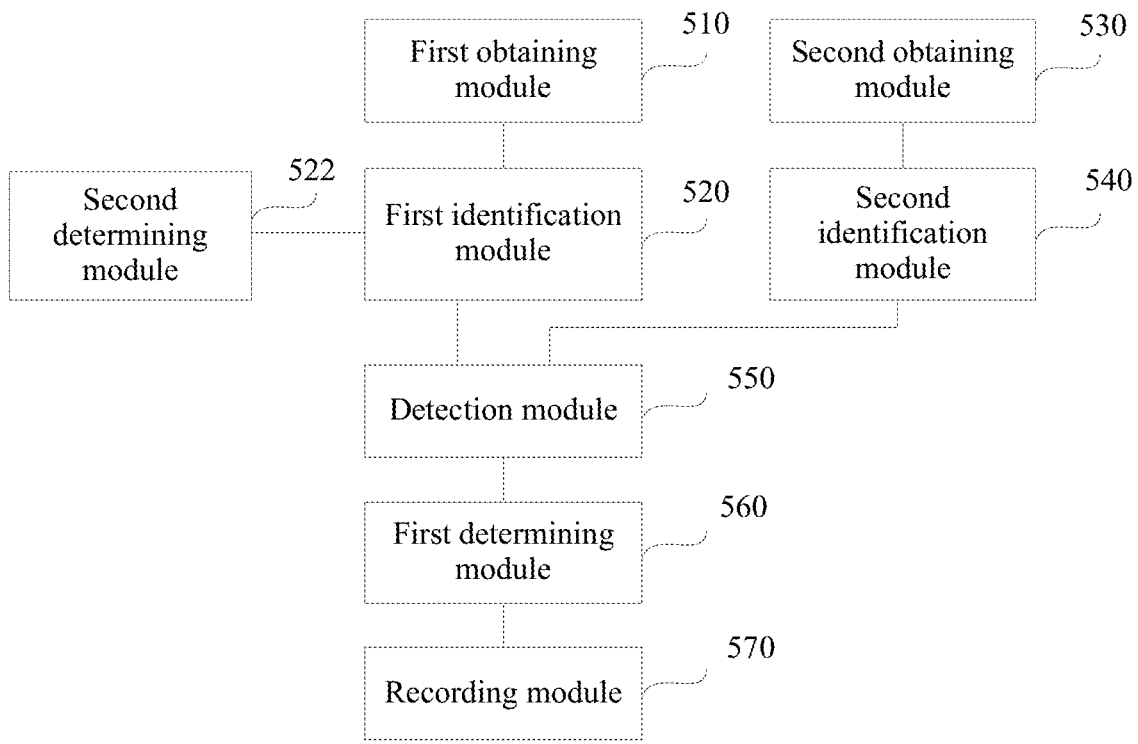
FIG. 5 is a structural block diagram of a display defect detection apparatus for a display screen according to another embodiment of the present invention.

Referring to FIG. 5, FIG. 5 shows a structural block diagram of a display defect detection apparatus for a display screen according to another embodiment of the present invention. Software, hardware, or a combination of the software and the hardware may be used to implement the apparatus as a part or all of an electronic device that has a computing processing capability. The apparatus may include a first obtaining module 510, a first identification module 520, a second obtaining module 530, a second identification module 540, a detection module 550, and a first determining module 560.

The first obtaining module 510 is configured to obtain a first image of a front side of a tested display screen, where the first image is shot when the tested display screen is in a solid-color display state, and the front side of the tested display screen is a side that is of the tested display screen and that is used to display an image.

The first identification module 520 is configured to: identify a suspected defective pixel from the first image obtained by the first obtaining module 510, where the suspected defective pixel is a pixel that is in a display area of the tested display screen and whose pixel feature belongs to a first numerical interval, and the first numerical interval is a value range corresponding to a pixel feature of the suspected defective pixel.

The second obtaining module 530 is configured to obtain a second image of the front side of the tested display screen, where the second image is shot when the tested display screen is in a die-out state and the front side of the tested display screen is illuminated by a diffuse reflection light source.

The second identification module 540 is configured to: identify an external smudgy pixel from the second image obtained by the second obtaining module 530, where the external smudgy pixel is a pixel that is in the display area of the tested display screen and whose pixel feature belongs to a second numerical interval, and the second numerical interval is a value range corresponding to a pixel feature of the external smudgy pixel.

The detection module 550 is configured to detect, for each suspected defective pixel identified by the first identification module 520 from the first image, whether a pixel at a same location in the second image is the external smudgy pixel.

The first determining module 560 is configured to determine the suspected defective pixel as a display defective pixel if the detection module 550 detects that the same location in the second image is not the external smudgy pixel.

In a possible implementation, the first identification module 520 is specifically configured to:

separately obtain a pixel feature of each pixel in the display area of the tested display screen in the first image obtained by the first obtaining module 510, where the pixel feature includes a luminance value and/or a contrast;

detect whether a first candidate pixel whose pixel feature belongs to the first numerical interval exists in the display area of the tested display screen;

if the first candidate pixel whose pixel feature belongs to the first numerical interval exists in the display area of the tested display screen, detect whether a first candidate pixel block constituted by sequentially arranged first candidate pixels exists and a quantity of pixels in the first candidate pixel block is greater than a first preset threshold; and if the first candidate pixel block exists, identify each first candidate pixel in the first candidate pixel block as the suspected defective pixel.

Similarly, in a possible implementation, the second identification module 540 is specifically configured to:

separately obtain a pixel feature of each pixel in the display area of the tested display screen in the second image obtained by the second obtaining module 530, where the pixel feature includes a luminance value and/or a contrast;

detect whether a second candidate pixel whose pixel feature belongs to the second numerical interval exists in the display area of the tested display screen;

if the second candidate pixel whose pixel feature belongs to the second numerical interval exists in the display area of the tested display screen, detect whether a second candidate pixel block constituted by sequentially arranged second candidate pixels exists and a quantity of pixels in the second candidate pixel block is greater than a second preset threshold; and if the second candidate pixel block exists, identify each second candidate pixel in the second candidate pixel block as the external smudgy pixel.

Optionally, the apparatus provided in this embodiment further includes a second determining module 522.

The second determining module 522 is configured to: if no suspected defective pixel is identified by the first identification module 520 from the first image, determine that the tested display screen has no display defect.

Optionally, the apparatus provided in this embodiment further includes a recording module 570.

The recording module 570 is configured to record a location of the display defective pixel that is determined by the first determining module 560 and that is in the display area of the tested display screen.

In conclusion, according to the apparatus provided in this embodiment, the suspected defective pixel is identified from the first image, and the external smudgy pixel is identified from the second image, so as to determine whether the suspected defective pixel is a display defective pixel according to a location of the suspected defective pixel in the first image and a location of the external smudgy pixel in the second image. Therefore, this resolves a prior-art problem that a detection speed is decreased and detection efficiency is affected when a dedicated cleaning phase is added to reduce an erroneous detection probability; and implements automatic differentiation between an actual display defect and an external smudge, so that erroneous detection caused by a smudge can be avoided, and a detection speed and detection efficiency are also significantly improved compared with those in the prior art.

In addition, the first candidate pixel block constituted by sequentially arranged first candidate pixels whose quantity is greater than the first preset threshold is further identified as one suspected defect. Therefore, on the one hand, a tiny display defect that basically imposes no impact on actual use is filtered out; on the other hand, interference from digital noise in the first image to an identification result can be eliminated; furthermore, a subsequent computing processing amount can also be reduced. Similarly, the second candidate pixel block constituted by sequentially arranged second candidate pixels whose quantity is greater than the second preset threshold is identified as one external smudge, so as to eliminate interference from digital noise in the second image to an identification result.

It should be noted that in the foregoing apparatus embodiments, the division of the foregoing function modules is merely used as an example for description. In actual application, the foregoing functions may be allocated to different function modules for completion according to a requirement, that is, an internal structure of the device is divided into different function modules, so as to complete all or a part of functions described above. In addition, the display defect detection apparatus for a display screen provided in the foregoing embodiments and the method embodiment of the display defect detection method for a display screen belong to a same concept. For a specific implementation process, refer to the method embodiment, and details are not described herein.

An embodiment of the present invention further provides an electronic device, and the electronic device may be a computer. The electronic device includes the display defect detection apparatus for a display screen provided in the embodiment shown in FIG. 4 or FIG. 5. Function modules in the apparatus are in a one-to-one correspondence to blocks in the foregoing method embodiment. For details, refer to description and introductions in the method embodiment, and the details are not described herein.

Figure 6:
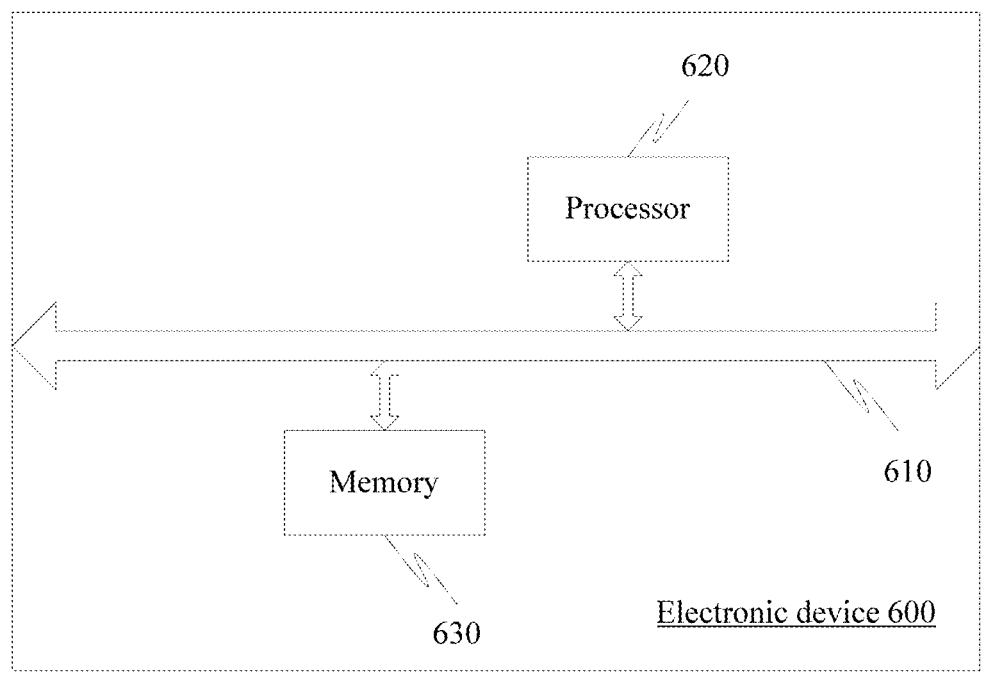
FIG. 6 is a structural block diagram of an electronic device according to an embodiment of the present invention.

Referring to FIG. 6, FIG. 6 shows a structural block diagram of an electronic device according to an embodiment of the present invention. As shown in FIG. 6, an electronic device 600 includes a bus 610, and a processor 620 and a memory 630 that communicate by using the bus 610. The memory 630 is configured to store one or more instructions, and the instructions are configured to be executed by the processor 620.

The processor 620 is configured to obtain a first image of a front side of a tested display screen, where the first image is shot when the tested display screen is in a solid-color display state, and the front side of the tested display screen is a side that is of the tested display screen and that is used to display an image.

The processor 620 is further configured to identify a suspected defective pixel from the first image, where the suspected defective pixel is a pixel that is in a display area of the tested display screen and whose pixel feature belongs to a first numerical interval, and the first numerical interval is a value range corresponding to the pixel feature of the suspected defective pixel.

The processor 620 is further configured to obtain a second image of the front side of the tested display screen, where the second image is shot when the tested display screen is in a die-out state and the front side of the tested display screen is illuminated by a diffuse reflection light source.

The processor 620 is further configured to identify an external smudgy pixel from the second image, where the external smudgy pixel is a pixel that is in the display area of the tested display screen and whose pixel feature belongs to a second numerical interval, and the second numerical interval is a value range corresponding to a pixel feature of the external smudgy pixel.

The processor 620 is further configured to detect, for each suspected defective pixel identified from the first image, whether a pixel at a same location in the second image is the external smudgy pixel.

The processor 620 is further configured to determine the suspected defective pixel as a display defective pixel if the same location in the second image is not the external smudgy pixel.

In conclusion, according to the electronic device provided in this embodiment, the suspected defective pixel is identified from the first image, and the external smudgy pixel is identified from the second image, so as to determine whether the suspected defective pixel is a display defective pixel according to a location of the suspected defective pixel in the first image and a location of the external smudgy pixel in the second image. Therefore, this resolves a prior-art problem that a detection speed is decreased and detection efficiency is affected when a dedicated cleaning phase is added to reduce an erroneous detection probability; and implements automatic differentiation between an actual display defect and an external smudge, so that erroneous detection caused by a smudge can be avoided, and a detection speed and detection efficiency are also significantly improved compared with those in the prior art.

In an optional embodiment provided based on the embodiment shown in FIG. 6, the processor 620 is specifically configured to:

separately obtain a pixel feature of each pixel in the display area of the tested display screen in the first image, where the pixel feature includes a luminance value and/or a contrast;

detect whether a first candidate pixel whose pixel feature belongs to the first numerical interval exists in the display area of the tested display screen;

if the first candidate pixel whose pixel feature belongs to the first numerical interval exists in the display area of the tested display screen, detect whether a first candidate pixel block constituted by sequentially arranged first candidate pixels exists and a quantity of pixels in the first candidate pixel block is greater than a first preset threshold; and if the first candidate pixel block exists, identify each first candidate pixel in the first candidate pixel block as the suspected defective pixel.

In an optional embodiment provided based on the embodiment shown in FIG. 6, the processor 620 is specifically configured to:

separately obtain a pixel feature of each pixel in the display area of the tested display screen in the second image, where the pixel feature includes a luminance value and/or a contrast;

detect whether a second candidate pixel whose pixel feature belongs to the second numerical interval exists in the display area of the tested display screen;

if the second candidate pixel whose pixel feature belongs to the second numerical interval exists in the display area of the tested display screen, detect whether a second candidate pixel block constituted by sequentially arranged second candidate pixels exists and a quantity of pixels in the second candidate pixel block is greater than a second preset threshold; and if the second candidate pixel block exists, identify each second candidate pixel in the second candidate pixel block as the external smudgy pixel.

In an optional embodiment provided based on the embodiment shown in FIG. 6, the processor 620 is further configured to: if no suspected defective pixel is identified from the first image, determine that the tested display screen has no display defect.

In an optional embodiment provided based on the embodiment shown in FIG. 6, the processor is further configured to record a location of the display defective pixel in the display area of the tested display screen.

It should be understood that the singular form "one" ("a", "an", "the") used in the document is intended to further include a plural form unless the context clearly supports an otherwise case. It should also be understood that "and/or" used herein indicates and includes any or all possible combinations of one or more associated listed items.

The sequence numbers of the foregoing embodiments of the present invention are merely for illustrative purposes, and are not intended to indicate priorities of the embodiments.

A person of ordinary skill in the art may understand that all or some of the blocks of the embodiments may be implemented by hardware or a program instructing related hardware. The program may be stored in a computer-readable storage medium. The storage medium may include: a read-only memory, a magnetic disk, or an optical disc.

The foregoing descriptions are merely example embodiments of the present invention, but are not intended to limit the present invention. Any modification, equivalent replacement, and improvement made without departing from the spirit and principle of the present invention shall fall within the protection scope of the present invention.

What is claimed is:

1. A display defect detection method for a display screen, the method comprising:

obtaining a first image of a front side of a tested display screen, wherein the first image is shot when the tested display screen is in a solid-color display state, and the front side of the tested display screen is a side that is used to display an image;

separately obtaining a pixel feature of each pixel in the display area of the tested display screen in the first image, wherein the pixel feature comprises at least one of a luminance value and a contrast value;

detecting whether a first candidate pixel whose pixel feature belongs to the first numerical interval exists in the display area of the tested display screen;

when the first candidate pixel whose pixel feature belongs to the first numerical interval exists in the display area of the tested display screen, detecting whether a first candidate pixel block constituted by sequentially arranged first candidate pixels exists and a quantity of pixels in the first candidate pixel block is greater than a first preset threshold;

when the first candidate pixel block exists, identifying each first candidate pixel in the first candidate pixel block as the suspected defective pixel;

obtaining a second image of the front side of the tested display screen, wherein the second image is shot when the tested display screen is in a die-out state and the front side of the tested display screen is illuminated by a diffuse reflection light source;

identifying an external smudgy pixel from the second image, wherein the external smudgy pixel is a pixel that is in the display area of the tested display screen and whose pixel feature belongs to a second numerical interval in a value range corresponding to a pixel feature of the external smudgy pixel;

detecting, for each suspected defective pixel identified from the first image, whether a pixel at a same location in the second image is the external smudgy pixel; and determining the suspected defective pixel as a display defective pixel if the same location in the second image is not the external smudgy pixel.

2. The method according to claim 1, wherein the identifying an external smudgy pixel from the second image comprises:

separately obtaining a pixel feature of each pixel in the display area of the tested display screen in the second image, wherein the pixel feature comprises at least one of a luminance value and a contrast value;

detecting whether a second candidate pixel whose pixel feature belongs to the second numerical interval exists in the display area of the tested display screen;

when the second candidate pixel whose pixel feature belongs to the second numerical interval exists in the display area of the tested display screen, detecting whether a second candidate pixel block constituted by sequentially arranged second candidate pixels exists and a quantity of pixels in the second candidate pixel block is greater than a second preset threshold; and when the second candidate pixel block exists, identifying each second candidate pixel in the second candidate pixel block as the external smudgy pixel.

3. The method according to claim 1, wherein after the identifying a suspected defective pixel from the first image, the method further comprises:

when no suspected defective pixel is identified from the first image, determining that the tested display screen has no display defect.

4. The method according to claim 1, wherein after the determining the suspected defective pixel as a display defective pixel, the method further comprises:

recording a location of the display defective pixel in the display area of the tested display screen.

5. The method according to claim 1, wherein an incident angle of an incident ray emitted by the diffuse reflection light source is greater than or equal to 35° and is less than or equal to 55°.

6. An electronic device, wherein the electronic device comprises a processor and a non-transitory computer readable memory configured to store one or more instructions that when executed by the processor perform the following steps;

obtaining a first image of a front side of a tested display screen, wherein the first image is shot when the tested display screen is in a solid-color display state, and the front side of the tested display screen is a side that is of the tested display screen and that is used to display an image;

separately obtaining a pixel feature of each pixel in the display area of the tested display screen in the first image, wherein the pixel feature comprises at least one of a luminance value and a contrast value;

detecting whether a first candidate pixel whose pixel feature belongs to the first numerical interval exists in the display area of the tested display screen;

when the first candidate pixel whose pixel feature belongs to the first numerical interval exists in the display area of the tested display screen, detecting whether a first candidate pixel block constituted by sequentially arranged first candidate pixels exists and a quantity of pixels in the first candidate pixel block is greater than a first preset threshold;

when the first candidate pixel block exists, identifying each first candidate pixel in the first candidate pixel block as the suspected defective pixel;

obtaining a second image of the front side of the tested display screen, wherein the second image is shot when the tested display screen is in a die-out state and the front side of the tested display screen is illuminated by a diffuse reflection light source;

identifying an external smudgy pixel from the second image, wherein the external smudgy pixel is a pixel that is in the display area of the tested display screen and whose pixel feature belongs to a second numerical interval in a value range corresponding to a pixel feature of the external smudgy pixel;

detecting, for each suspected defective pixel identified from the first image, whether a pixel at a same location in the second image is the external smudgy pixel; and determining the suspected defective pixel as a display defective pixel if the same location in the second image is not the external smudgy pixel.

7. The electronic device according to claim 6, specifically comprising instructions for:

separately obtaining a pixel feature of each pixel in the display area of the tested display screen in the second image, wherein the pixel feature comprises at least one of a luminance value and a contrast value;

detecting whether a second candidate pixel whose pixel feature belongs to the second numerical interval exists in the display area of the tested display screen;

when the second candidate pixel whose pixel feature belongs to the second numerical interval exists in the display area of the tested display screen, detecting whether a second candidate pixel block constituted by sequentially arranged second candidate pixels exists and a quantity of pixels in the second candidate pixel block is greater than a second preset threshold; and when the second candidate pixel block exists, identifying each second candidate pixel in the second candidate pixel block as the external smudgy pixel.

8. The electronic device according to claim 6, further comprising instructions for when no suspected defective pixel is identified from the first image, determining that the tested display screen has no display defect.

9. The electronic device according to claim 6, further comprising instructions for recording a location of the display defective pixel in the display area of the tested display screen.

10. A display defect detection device for a display screen, wherein the device comprises a support, and a display-screen fastening component, a diffuse reflection light source component, and an image acquisition component that are separately connected to the support, wherein the display-screen fastening component is configured to fasten a tested display screen;

the diffuse reflection light source component is configured to provide a diffuse reflection light source;

the image acquisition component is configured to obtain a first image by shooting a front side of the tested display screen when the tested display screen is in a solid-color display state, wherein the front side of the tested display screen is a side that is of the tested display screen and that is used to display an image; and the image acquisition component is further configured to obtain a second image by shooting the front side of the tested display screen when the tested display screen is in a die-out state and the front side of the tested display screen is illuminated by the diffuse reflection light source, wherein the diffuse reflection light source component comprises:

a housing;

a light emitting element disposed inside the housing, wherein the light emitting element is configured to provide the diffuse reflection light source;

a heat dissipation hole disposed on a surface of the housing; and a light shielding cover disposed around an incident ray emitted by the diffuse reflection light source.

11. The device according to claim 10, wherein the device further comprises a light source connection component, wherein the light source connection component is configured to connect the diffuse reflection light source component and the support in a movable manner.

12. The device according to claim 10, wherein an incident angle of an incident ray emitted by the diffuse reflection light source is greater than or equal to 35° and is less than or equal to 55°.

* * * * *